United States Patent Office 2,971,947
Patented Feb. 14, 1961

2,971,947

ANTI-STATIC MOLDING RESINS

Vernon D. Floria and Frank E. Towsley, Midland, Mich., assignors to The Dow Chemical Company, Midland, Mich., a corporation of Delaware No Drawing. Filed Mar. 30, 1956, Ser. No. 574,945

10 Claims. (Cl. 260—79.3)

This invention concerns certain new solid, thermoplastic resins possessing anti-static properties and a method of making the same. It pertains especially to moldable copolymers of monovinyl aromatic starting compounds, which copolymers contain sulfonate groups as nuclear substituents.

The tendency of polystyrene and many other synthetic resins to acquire and hold electrostatic charges is a drawback in handling the resins, especially in granular form, and detracts from their utility for many purposes to which they otherwise are well adapted. It has been proposed to sulfonate the outer surfaces of articles of the resins so as to render the surfaces electrically conductive and thus prevent accumulation of charges thereon. Although a surface sulfonation of a polystyrene article, is effective in preventing or reducing, the tendency toward accumulation of an electrostatic charge thereon, the effect of the surface-sulfonation usually diminishes quite rapidly during normal use of the articles, presumably because of a wearing and/or washing away of the thin sulfonated outer surfaces. It is also known to sulfonate vinyl aromatic resins such as polystyrene or styrene-divinylbenzene copolymers in ways resulting in introduction of sulfonic acid groups as nuclear substituents throughout a body of such resin and to convert the resulting resin sulfonic acid into a neutral salt thereof. However, resin sulfonates thus prepared have not been thermoplastic and have been reported as not capable of satisfactorily being molded or extruded directly to obtain articles of desired size and shape.

It has now been found that moldable copolymers containing sulfonate radicals in the polymer molecule and possessing anti-static properties can be prepared by copolymerizing unsulfonated vinylidene compounds, including a major amount of one or more monovinyl aromatic compounds, with a minor amount of one or more salts of monovinyl aromatic sulfonic acids in the presence of water and evaporating the resulting aqueous mixture, or synthetic latex, to dryness to obtain the copolymer as a residue. However, it is important that the copolymers be prepared as hereinafter described, since attempts to prepare the copolymers in other ways resulted in formation of polymeric materials not having anti-static properties to an appreciable extent.

It may be mentioned that the procedure for making a synthetic latex of the copolymers is described in a co-pending application, Serial No. 443,697, filed July 15, 1954, by V. D. Floria, one of the present applicants. The present application does not claim said procedure, per se, but only in combination with other steps for obtaining solid, thermoplastic, anti-static copolymers of the present invention.

The solid, moldable, anti-static resins which are provided by the invention are copolymers of two or more vinylidene compounds having only a single olefinic linkage in the molecule, including a total of from about 1.5 to about 8, preferably from 2.5 to 5.0, mole percent of at least one ar-monovinyl aromatic sulfonate in salt form, and a total of from about 98.5 to 92, preferably from 97.5 to 95.0, mole percent of at least one unsulfonated monovinyl aromatic compound such as styrene, ar-methylstyrene, ar-chlorostyrene, or ar-dichlorostyrene, etc. The monovinyl aromatic sulfonate should be a salt which is sufficiently soluble in water to form at room temperature an at least 3 weight percent solution thereof. Examples of suitable salts of monovinyl aromatic sulfonic acids are sodium styrenesulfonate, potassium styrenesulfonate, calcium styrenesulfonate, triethylammonium styrenesulfonate, sodium ar-methylstyrenesulfonate, potassium ar-methylstyrenesulfonate, etc. It is important that the copolymers contain the chemically combined vinyl aromatic sulfonate in proportions within the above-stated limits. The copolymers containing smaller proportions of the vinyl aromatic sulfonate usually do not possess anti-static properties, i.e. an ability to readily lose an electrostatic charge, to a satisfactory extent. The copolymers containing the vinyl aromatic sulfonate in proportions greater than stated above are in most instances not thermoplastic or possess softening temperatures too high and too close to the thermal decomposition temperatures to permit satisfactory molding of the same. Copolymers of styrene and sodium styrenesulfonate in the above-stated molecular proportions contain, on a weight basis, from 3 to 15 percent of chemically combined sodium styrenesulfonate. In place of part of the unsulfonated vinyl aromatic compound, the copolymer may contain, in chemically combined form, minor proportions, e.g. up to 10 mole percent, of one or more other polymerizable vinylidene compounds having only a single olefinic group in the molecule such as methyl methacrylate, ethyl acrylate, or alpha-methylstyrene, etc. The invention pertains especially to copolymers of styrene and/or vinyltoluene with salts of p-styrene sulfonic acid in the above-stated proportions.

The copolymers are made by heating a mixture of the monomers in relative proportions within the above-stated limits, together with a polymerization catalyst comprising, or consisting, of a water-soluble persulfate, sufficient water to dissolve the vinyl aromatic sulfonate reactant and the persulfate, and an agent for promoting occurrence of a copolymerization reaction in preference to homopolymerization of the individual monomers. Usual emulsifying agents such as sodium oleate, sulfonated sperm oil, or higher alkyl aromatic sulfonates can be used to emulsify the aqueous mixture of the polymerizable starting materials and thus promote occurrence of a copolymerization reaction, but such agents tend to be retained as impurities in the copolymer products and their presence is often not desired. It has been found that water-soluble, ionizable salts other than the persulfate catalyst, even when present only in minor amounts in a heterogeneous mixture of water, the catalyst, and the polymerizable starting compounds are highly effective in promoting the copolymerization reaction to form a latex of the copolymer product. Such salts are preferably used in the absence of conventional emulsifying agents, but they can be used together with emulsifying agents if desired.

Any of a wide variety of water-soluble salts having ionization constants of $10^{-5}$ or greater can be used in the reaction mixture to promote occurrence of the copolymerization reaction. Exceptions are sodium and potassium nitrites which are polymerization inhibitors. Examples of suitable salts are sodium chloride, sodium bromide, sodium sulfate, potassium chloride, potassium bromide, potassium sulfate, calcium chloride, calcium bromide, barium chloride, barium bromide, and triethylammonium bromide, etc.

The water-soluble, ionizable salts are advantageously employed in small proportions corresponding to from 0.02 to 1 percent of the weight of the entire reaction mixture, the preferred proportion being dependent on the kind of salt used. The ionizable salts can sometimes be used satisfactorily in proportions smaller than just stated or they can be used in much larger proportions. The vinyl aromatic sulfonates which are employed as polymerizable starting materials are produced by a method that results in formation of a water-soluble metal halide, e.g. a chloride or bromide of sodium or potassium, and in some instances in formation of a corresponding alkali metal sulfate together therewith. These water-soluble, ionizable inorganic salts, especially the alkali metal halides and more particularly sodium or potassium bromide, are conveniently used for the purpose of the invention and are preferred. One or more of the alkali metal chlorides or bromides are usually added, as such, or together with the vinyl aromatic sulfonate reactant, in amount corresponding to from 0.02 to 10, preferably from 0.05 to 5, percent of the weight of the reaction mixture and they can be employed in somewhat smaller or in even larger proportions.

Although one or more water-soluble inorganic persulfates, such as sodium or potassium persulfate can be used as the only catalyst for the copolymerization reaction, the latter usually occurs more smoothly and satisfactorily when an organic peroxide, such as dibenzoyl peroxide, or dilauroyl peroxide, etc., is also present in the mixture as an oil-soluble catalyst ingredient. The catalyst preferably comprises about equal weights of an inoragnic persulfate and an organic peroxide, but the latter can be used in larger or smaller proportions, or can be omitted. The catalyst is usually employed in amount corresponding to from 0.1 to 1, preferably from 0.12 to 0.5, percent of the weight of the water in the polymerization mixture, but it can be used in somewhat smaller or in larger proportions.

A mixture of the aforementioned starting materials in the proportions given above is stirred or otherwise agitated, preferably in a closed vessel or in contact with an inert gas such as nitrogen, while at a polymerization temperature usually of from 40° to 100° C. or above. The polymerization usually is continued until substantially complete, but it can be terminated short of this point and unconsumed portions of the starting materials be vaporized from the reaction mixture. The latter comprises, and often consists of, a latex, i.e. an aqueous colloidal solution or dispersion of the copolymer product. Insoluble, undispersed polymeric material, if present, is preferably, but not necessarily removed from the latex.

The reacted mixture, or latex, is evaporated to dryness, preferably by heating the same under vacuum, to obtain the copolymeric product as a residue. The copolymer can be molded or extruded under the action of heat and pressure in conventional ways to form shaped articles of the same. Moldings of the copolymers are rigid at room temperature, transparent, and of good appearance. The tensile strength and impact strength of the copolymers are usually not as great as those of the corresponding unsulfonated polymeric materials, but are adequate for many purposes. Under ordinary atmospheric conditions, moldings of the copolymers of the invention exhibit less tendency to accumulate electrostatic charges and lose such charges more readily and rapidly than moldings of unsulfonated polymeric materials such as polystyrene. The rate at which electrostatic charges are dissipated from said copolymers becomes greater with increase in the humidity of the surrounding atmosphere, and vice versa. Articles molded from these copolymers can be handled or used extensively and can be washed repeatedly with water without losing their anti-static properties. Moldings of these copolymers are insoluble in water and undergo swelling through absorption of water to only a slight extent even when immersed in boiling water for two hours. Because of their anti-static properties, dust has less tendency to accumulate on, and is more readily wiped from, moldings of those copolymers than on, or from, moldings of otherwise similar unsulfonated polymeric materials such as polystyrene.

The following examples describe ways in which the invention has been applied and illustrate certain of its advantages, but are not to be construed as limiting its scope.

EXAMPLE 1

In each of a number of experiments, a heterogeneous mixture of water, styrene, a water-soluble salt of p-styrene sulfonic acid, and a water-soluble metal bromide was heated to 80° C. in a flask provided with a reflux condenser and a stirrer. It may be mentioned that the p-styrene sulfonate, in the amount given on a weight basis, was of the weight percent purity indicated in the following table and contained as an impurity the kind and weight percent of metal bromide also indicated. Nitrogen was fed into the vessel to sweep air therefrom and maintain a nitrogen atmosphere in the vessel. A catalyst consisting of a mixture of equal parts by weight of sodium persulfate and an organic peroxide was added. The mixture was stirred and heated at 80° C. in contact with nitrogen until the polymerization was complete, i.e. until substantially all of the styrene and the styrenesulfonate were consumed. In each experiment, a latex of the copolymer was obtained as the product. In each experiment, the latex was evaporated to dryness under vacuum by a usual spray drying operation. Except for one of the coplyomers which could not be molded even when heated to temperatures as high as 350° C., the copolymers were molded into test pieces for use in determining properties of the same. All of the moldings were transparent, of light yellow color or tint, and were of good appearance. The tensile strength; the percent elongation value, i.e. the percent of its initial length by which a bar of a copolymer could be stretched before breaking; the impact strength; and the heat distortion temperature of each copolymer were determined in accordance with standard test procedures. Heat distortion values were determined by a method similar to that described in A.S.T.M. Bull. 134, 37–41 (1945), except that the test piece which was employed was ⅛ inch thick and ½ inch wide and a load of 405 grams was applied. The test pieces for use in determining the tensile strength and percent elongation values were 6½ inches long and had enlarged end sections for gripping the same. The midsection of each such piece was a rectangular bar having shoulder to shoulder dimensions of 2¾ inches x ½ inch x ⅛ inch. Test bars having these dimensions of 2¾ inches x ½ inch x ⅛ inch were used in determining the impact strength by the well known Izod method. Except as otherwise indicated the test pieces used in determining the impact strength were each provided with a transverse notch of 0.1 inch depth across the edge of ⅛ inch thickness along a line midway between the ends of the same. It was this edge which was struck by a hammer in making the measurement. Molded copolymer rods having known dimensions were tested in contact with air at 25° C. and 70 percent relative humidity to determine the resistivity to passage of an electric current over a known length of such rod. The resistivity is calculated in accordance with the formula:

$$K = \frac{RC}{L}$$

where K is the resistivity in ohms, R is the ohms of resistance measured for the test rod, C is the circumference of the rod in centimeters and L is the length in centimeters of the rod between the electrodes at the ends thereof. The following table names and gives the amounts of the starting materials used in making each of the copolymers. It gives the time of heating the mixture at 80° C. to form the copolymer. tI also gives the proportions of the p-styrene sulfonate, expressed both as weight percent and as mole percent, in each copolymer. The table also gives the temperature at which each copolymer was molded under pressure to form the test pieces. It also gives the properties which were determined for each of the copolymers.

carrying out these operations were similar to those described in Example 1, except for the kinds of unsulfonated vinyl aromatic compounds or p-styrene sulfonate employed, and that in one of the experiments the soluble ionizable bromide was trimethylammonium bromide

*Table I*

| Run No. | Starting Mixture | | | | | | | Polym. time, hrs. |
|---|---|---|---|---|---|---|---|---|
| | $H_2O$, ml. | Styrene, gms. | p-Styrene sulfonate | | | | Catalyst, gms. | |
| | | | Kind | gms. | Purity, percent | Metal Bromide therein | | |
| | | | | | | Kind | Percent | |
| 1 | 600 | 396 | Na | 4 | 99 | NaBr | 0.5–1 | ª 1.2 | 8 |
| 2 | 600 | 388 | Na | 12 | 99 | NaBr | 0.5–1 | ª 1.2 | 6 |
| 3 | 600 | 384 | Na | 16 | 99 | NaBr | 0.5–1 | ª 1.2 | 12 |
| 4 | 600 | 380 | Na | 20 | 99 | NaBr | 0.5–1 | ª 1.2 | 6 |
| 5 | 1,100 | 675 | Na | 75 | 99 | NaBr | 0.5–1 | ª 2.2 | 6 |
| 6 | 750 | 425 | Na | 75 | 95 | NaBr | 2 | ª 1.5 | 3 |
| 7 | 175 | 60 | Na | 15 | 99 | NaBr | 0.5–1 | ª 0.26 | 6 |
| 8 | 1,200 | ᶜ 760 | Na | 40 | 80 | NaBr | 5 | ᵇ 2.4 | 15 |
| 9 | 1,050 | 427 | Ca | 24 | 90 | $CaBr_2$ | 5 | ª 2.1 | 24 |

| Run No. | Styrene-sulfonate combined in copolymer | | Molding Temp., °C. | Properties of Copolymer | | | | |
|---|---|---|---|---|---|---|---|---|
| | Wt. percent | Mole percent | | Tensile Strength, lbs./sq. in. | Impact Strength, ft.-lbs. | Percent Elongation Value | Heat Dist. Temp., °C. | Resistivity, ohms |
| 1 | 1 | 0.5 | 238 | 6,100 | 0.86 | 2.3 | 84 | 1×10¹¹ |
| 2 | 3 | 1.5 | 280 | 3,300 | 0.25 | 1.1 | 88 | 3×10¹⁰ |
| 3 | 4 | 2.0 | 268 | 2,600 | 0.24 | 0.9 | 88 | 1×10¹⁰ |
| 4 | 5 | 2.6 | 280 | 1,750 | 0.24 | 0.6 | 92 | 3×10⁹ |
| 5 | 10 | 5.3 | 305 | 1,200 | 0.26 | 0.4 | 92 | 6×10⁸ |
| 6 | 14 | 7.8 | 243 | 4,200 | ᵈ 0.5 | 1.8 | 91 | 5×10⁷ |
| 7 | 20 | 11.0 | | Not moldable at 350° C. | | | | |
| 8 | 4 | 2.1 | 271 | 4,900 | 0.48 | 1.7 | 86 | 4×10⁹ |
| 9 | 5 | 1.3 | 252 | (not determined) | | | | 1×10¹⁰ |

ª Catalyst consisted of equal parts by weight of sodium persulfate and dibenzoyl peroxide.
ᵇ Catalyst consisted of equal parts by weight of sodium persulfate and dilauroyl peroxide.
ᶜ The styrene was added dropwise over one hour to the rest of the mixture while heating.
ᵈ This value is that of an unnotched test bar.

EXAMPLE 2

Other copolymers of unsulfonated vinyl aromatic compounds and p-styrenesulfonates were prepared, separated in solid form, molded, and the moldings were tested to determine several properties thereof. The procedures in rather than sodium bromide. Table II gives the composition of each starting mixture, the proportion of the p-styrenesulfonate combined in the copolymer, expressed both as weight percent and as mole percent, the temperature at which each copolymer was molded; and several properties of the moldings.

*Table II*

| Run No. | Starting Mixture | | | | | | | |
|---|---|---|---|---|---|---|---|---|
| | $H_2O$, ml. | Unsulfonated reactant | | p-Styrenesulfonate | | | | Catalyst, gms. |
| | | Kind | gms. | Kind | gms. | purity, percent | Ionizable Bromide therein | |
| | | | | | | | Kind | Percent | |
| 1 | 900 | p-methyl-styrene. | 570 | Na | 30 | 95 | NaBr | 2 | 1.8 |
| 2 | 600 | 2,5-dichloro-styrene. | 380 | Na | 20 | 99 | NaBr | 0.5–1 | 2.4 |
| 3 | 1,800 | Styrene | 1,140 | triethyl-ammonium. | 60 | about 98 | trimethyl-ammonium bromide. | about 1.7 | 6.0 |

| Run No. | Polym. time, hrs. | Styrenesulfonate in copolymer | | Molding Temp., °C. | Properties of Copolymer | | | |
|---|---|---|---|---|---|---|---|---|
| | | Wt. percent | Mole percent | | Tensile Strength, lbs./sq. in. | Percent Elongation | Impact Strength, ft.-lbs. | Heat Dist. Temp., °C. |
| 1 | ª 3 | 5 | 2.8 | 249 | 3,250 | 1.3 | 0.23 | 67 |
| 2 | ᵇ 30 | 5 | 4.2 | 265 | 3,000 | 0.9 | 0.30 | 76 |
| 3 | ª 2.5 | 5 | about 1.9 | 268 | 4,900 | 1.8 | 0.22 | 91 |

EXAMPLE 3

Molded test pieces of copolymers of styrene and sodium p-styrenesulfonates, which had been prepared in a manner similar to that described in Example 1 and which contained the percent by weight of chemically combined sodium p-styrenesulfonate indicated in Table III, were tested to determine whether their anti-static properties would be changed appreciably by washing the test pieces with water. A test piece of each copolymer was conditioned by standing in contact with air at 70° F. and 65 percent relative humidity and then the electric resistivity of the test pieces was determined under these same atmospheric conditions as described in Example 1. Test pieces of the same copolymers were subjected repeatedly to a cycle of operations of washing the same with soap and water and rinsing with hot water. After the test pieces had been subjected to this washing cycle for the number of times indicated in the table, they were rinsed with acetone and then conditioned by standing in contact with air at 70° F. and 65 percent relative humidity for 72 hours. They were then tested to determine the electric resistivity of the same while in contact with air at the temperature and of the humidity just stated. Table III indicates the composition of each copolymer test piece, states the number of washing cycles to which it was subjected before determining its electric resistivity, and gives the resistivity value that was determined. In the table, sodium styrenesulfonate is abbreviated as "NaSS."

Table III

| Percent NaSS in Copolymer | Washing Cycles | Restivity, ohms |
|---|---|---|
| 5 | 0 | $4 \times 10^9$ |
| 5 | 3 | $1 \times 10^9$ |
| 5 | 10 | $1 \times 10^9$ |
| 10 | 0 | $3 \times 10^8$ |
| 10 | 3 | $9 \times 10^8$ |
| 10 | 10 | $8 \times 10^7$ |

EXAMPLE 4

Molded pieces of copolymers of styrene and sodium styrenesulfonate that had been prepared in a manner similar to that described in Example 1, and that contained the proportions of chemically combined sodium styrenesulfonate indicated in Table IV were tested to determine the extent to which they absorb water. Each dry test piece was weighed, then immersed in boiling water for two hours, and removed, surface-dried by wiping with a cloth, and again weighed. The difference between the weight of a test piece before and after immersion in the water is due to absorption of water. Table IV gives the percent by weight of sodium styrenesulfonate chemically combined in each copolymer and the percent by weight of water that was absorbed therein under the above test conditions.

Table IV

| Percent NaSS in Copolymer | Percent of $H_2O$ absorbed |
|---|---|
| 3 | 0.4 |
| 5 | 0.6 |
| 7 | 0.6 |

We claim:

1. A moldable thermoplastic copolymer consisting essentially of copolymerized vinylidene compounds having only a single olefinic linkage in the molecule and comprising a major proportion of at least one unsulfonated vinyl aromatic compound, selected from the class consisting of monovinyl aromatic hydrocarbons and nuclear halogenated derivatives thereof, and a minor proportion, corresponding to from 1.5 to 8 mole percent of the combined amount of the vinylidene compounds, of at least one ar-vinyl aromatic sulfonic acid salt, which copolymer is much more conductive to electricity than is polystyrene under similar test conditions.

2. A moldable thermoplastic copolymer of vinylidene compounds having only a single olefinic linkage in the molecule, which copolymer comprises in chemically combined form a total of from 92 to 98.5 mole percent of at least one unsulfonated monovinyl aromatic compound, selected from the class consisting of monovinyl aromatic hydrocarbons and nuclear halogenated derivatives thereof, and a total of from 8 to 1.5 mole percent of at least one ar-vinyl aromatic sulfonic acid salt, which copolymer is considerably more conductive to electricity than is polystyrene under similar test conditions.

3. A moldable thermoplastic copolymer of from 92 to 98.5 mole percent of at least one unsulfonated monovinyl aromatic compound, selected from the class consisting of monovinyl aromatic hydrocarbons and nuclear halogenated derivatives thereof, and from 8 to 1.5 mole percent of a water-soluble salt of styrene sulfonic acid, which copolymer possesses anti-static properties.

4. A moldable thermoplastic copolymer of from 92 to 98.5 mole percent of styrene and from 8 to 1.5 mole percent of a water-soluble salt of styrene sulfonic acid, which copolymer possesses anti-static properties.

5. A moldable thermoplastic copolymer of from 95 to 97.5 mole percent of styrene and from 5 to 2.5 mole percent of sodium styrenesulfonate which copolymer possesses anti-static properties.

6. A moldable thermoplastic copolymer of styrene and a minor amount of calcium styrenesulfonate, which copolymer possesses anti-static properties.

7. A moldable thermoplastic copolymer of styrene and a minor amount of triethylammonium styrenesulfonate, which copolymer possesses anti-static properties.

8. A moldable thermoplastic copolymer of ar-methylstyrene and a minor amount of sodium styrenesulfonate, which copolymer possesses anti-static properties.

9. A moldable thermoplastic copolymer of 2,5-dichlorostyrene and a minor amount of sodium styrenesulfonate, which copolymer possesses anti-static properties.

10. A method which comprises copolymerizing a mixture of vinylidene compounds having only a single olefinic group in the molecule and comprising from 98.5 to 92 mole percent of at least one unsulfonated monovinyl aromatic compound selected from the class consisting of monovinyl aromatic hydrocarbons and nuclear halogenated derivatives thereof, and from 1.5 to 8 mole percent of at least one ar-vinyl aromatic sulfonic acid salt in admixture with sufficient water to dissolve the ar-vinyl aromatic sulfonic acid salt, and a water-soluble polymerization catalyst and a water-soluble, ionizable salt other than a nitrate and persulfate, which ionizable salt is one having an ionization constant at least as high as $10^{-5}$ and is present in a proportion corresponding to from 0.02 to 1 percent of the weight of the entire mixture, and evaporating the resulting aqueous copolymer dispersion to dryness to obtain a residual solid copolymer which is moldable, thermoplastic and possesses anti-static properties.

References Cited in the file of this patent

UNITED STATES PATENTS

| | | |
|---|---|---|
| 2,527,300 | Dudley | Oct. 24, 1950 |
| 2,533,211 | Baer | Dec. 12, 1950 |
| 2,616,917 | Coover et al. | Nov. 4, 1952 |
| 2,837,500 | Andres et al. | June 3, 1958 |
| 2,837,501 | Millhiser | June 3, 1958 |

OTHER REFERENCES

Boundy et al.: Styrene, Its Polymers, Copolymers and Derivatives, page 680, Reinhold (1952).

UNITED STATES PATENT OFFICE

CERTIFICATE OF CORRECTION

Patent No. 2,971,947 February 14, 1961

Vernon D. Floria et al.

It is hereby certified that error appears in the above numbered patent requiring correction and that the said Letters Patent should read as corrected below.

Column 8, line 55, for "nitrate" read -- nitrite --.

Signed and sealed this 14th day of November 1961.

(SEAL)
Attest:

ERNEST W. SWIDER
Attesting Officer

DAVID L. LADD
Commissioner of Patents
USCOMM-DC